UNITED STATES PATENT OFFICE.

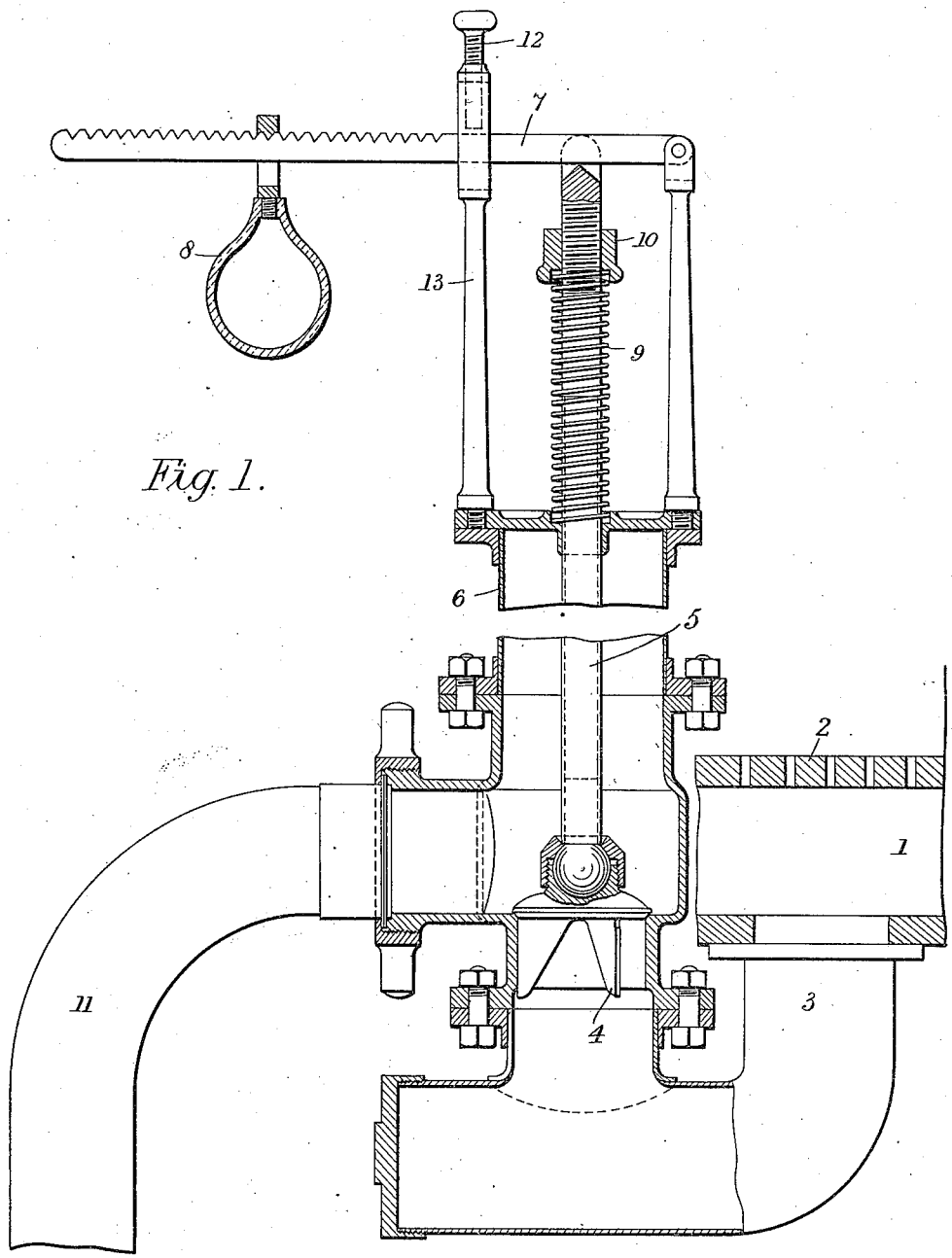

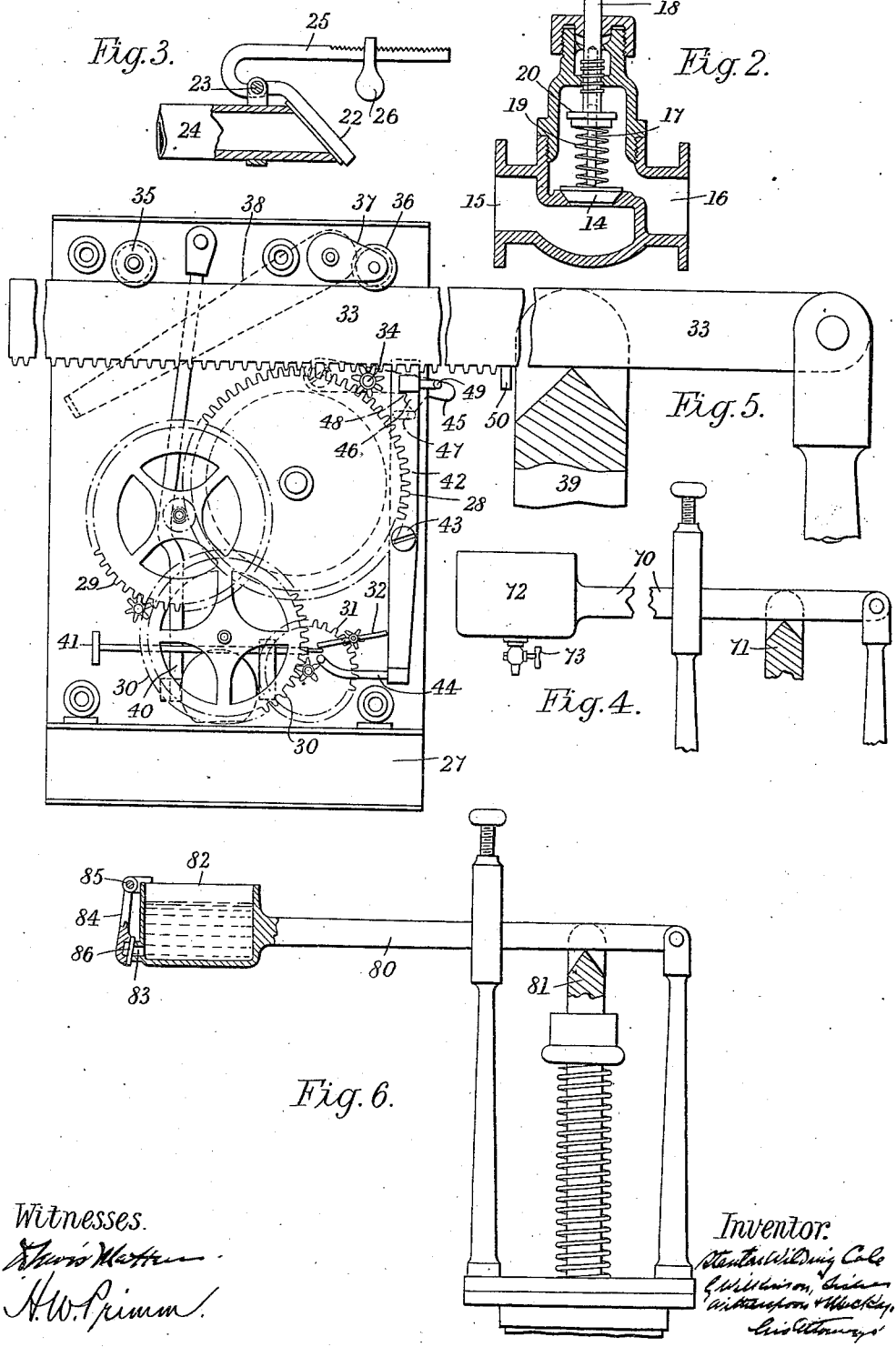

STANTON WILDING COLE, OF LONDON, ENGLAND.

WORT-REGULATOR FOR MASH-TUNS.

1,041,433.  Specification of Letters Patent.  Patented Oct. 15, 1912.

Application filed May 17, 1912. Serial No. 698,071.

*To all whom it may concern:*

Be it known that I, STANTON WILDING COLE, a subject of His Majesty the King of Great Britain and Ireland, residing at London, England, have invented new and useful Improvements in Wort-Regulators for Mash-Tuns, of which the following is a specification.

This invention relates to improvements in wort regulators for mash tuns the object of which is to insure an equal pressure below and above the usual perforated false bottom of the tun so that the mash does not settle thereon but remains open and available for the sparge water to act upon in the production of the extract or wort.

Apparatus has before been proposed in which the wort from the underside of the false bottom has to rise up in a column alongside of the tank such column having adjustable or other escape pipes so that it passes to the underback or copper from approximately the height of the wort in the mash tun, the level of which is thus substantially maintained.

According to the present invention an adjustable pressure valve is employed on the outlet of the mash tun which is adapted to keep the wort at any desired level however fast or slow the sparging may be. Further, means are provided for automatically regulating the pressure valve with the object of allowing the tun to be emptied with the least possible suction on the false bottom or the like therein, after the sparging operation is completed.

In a suitable form of apparatus for keeping the wort at any desired level during sparging the main which connects with the underside of the false bottom has a valve in it normally kept off its seat by a spring but counter-balanced by a pivoted lever and weight which may act on the valve spindle so that as the liquid in the mash tun begins say to fall the pressure on the underside of the valve is reduced, so that the lever and weight tend to close it, thus keeping the liquid back until it regains its original level, while if the liquid rises the valve lifts under the increased pressure and allows more to run off. The valve may also be controlled by means of an adjustable spring instead of the lever and weight.

The means for automatically regulating the pressure valve after the sparging operation is completed comprises an automatically adjustable counter-balance weight or its equivalent, adapted to act upon the pivoted counter-balance lever or the like bearing on the pressure valve or its spindle, or similarly regulating a valve, said weight or the like automatically changing its position or decreasing either at a fixed rate or intermittently as the mash tun empties and the pressure of the wort decreases.

In one form of the invention the pressure of the wort within the tun itself automatically causes the necessary movement of the counter-balance weight or its equivalent, and thus itself regulates the opening of the valve so that the wort runs off with the least possible suction on the false bottom or the like.

In one suitable arrangement the counter-balance weight consists of a vessel attached to the end of the pivoted counter-balance lever or the like which bears on the valve or its spindle, said vessel being filled with liquid and provided with an opening preferably fitted with a tap or cock. In operation, the tap or cock is opened and the liquid allowed to escape from the vessel gradually, thus producing a gradual diminution of the counter-balance weight and allowing the valve to take up the desired position. If desired the opening in the vessel or the tap or cock thereon could be regulated by means such as a pendulum, so that the liquid would only flow out of the vessel when the counter-balance lever fell below the horizontal as the valve moved toward the closed position. In another suitable form the counter-balance weight is moved automatically by suitable mechanism such as clockwork, along the pivoted counter-balance lever or the like toward the pivot point of same, thus gradually reducing the load upon the valve. Further, if desired, the clock-work or other mechanism may be so arranged as to cause the weight to move along the counter-balance lever or the like only when said lever or the like falls below the horizontal. In this case the weight and the pressure of the wort on the valve tend to maintain the counter-balance lever always in a horizontal position.

To enable the invention to be fully understood, it will now be described by reference to the accompanying drawings in which:—

Figure 1 is a sectional elevation of one form of wort regulator constructed according to the invention a portion only of the tun to which same is attached being shown. Figs. 2 and 3 are sectional elevations of further forms and Fig. 4 is a part sectional elevation of a portion of the counter-balance lever and valve having one form of automatically decreasing counter-balance weight thereon. Fig. 5 is a part sectional elevation of a portion of the counter-balance lever and valve stem of a wort regulator having one form of automatically moving counter-balance weight applied thereto. Fig. 6 is a similar view showing a further form of an automatically adjustable counter weight.

Referring first to Fig. 1:—The mash tun 1 having a perforated false bottom 2 is provided with a discharge main 3 in which main an adjustable pressure valve 4 is mounted. As shown the valve 4 is carried on a spindle 5 which passes up through the valve casing 6, said valve being loaded by means of the pivoted counter-balance lever 7 and the weight 8, the spring 9 bearing on the adjustable collar 10 and on the top of the casing 6 tending to lift the valve off its seat. The valve opens under the pressure of the wort and a discharge pipe 11 is provided for allowing the wort to pass to the boiling copper or back. It will be obvious that the above described valve may be adjusted to keep the wort in the tun 1, at any desired level during the sparging operation, for should the rate of sparging increase then the valve 4 would be lifted allowing more wort to run off while if the rate of sparging decreases then the valve tends to close until the liquid regains its former level. The valve 4 will normally be adjusted to keep the wort flowing off at such a rate that there is the least possible suction on the perforated false bottom 2 in the tun 1. For screwing the valve 4 down to stop the flow of wort during the mashing operation a thumb screw 12 mounted on the upright 13 is provided, the valve being here shown in the closed and screwed down position.

Fig. 2 shows a form of adjustable spring loaded pressure valve 14 adapted to be fitted in the outlet main 15 of the mash tun, the discharge taking place through the pipe 16 to the copper or under back. In this construction the valve 14 is carried on a rod 17 slidably mounted in the screwed stem 18, a spring 19 abutting at one end upon a stop 20 on the stem, and at the other upon the valve, being provided for loading the latter. It will be obvious that with this construction the load on the valve 14 may be adjusted by screwing the stem 18 in or out of its seating as desired by means of the hand wheel 21.

Fig. 3 shows an adjustable pressure valve in the form of a flap 22, pivoted at 23 and adapted to close the end of the outlet pipe 24 from the mash tun as shown. The load on this valve is regulated by the counter-balance lever 25 and the adjustable weight 26. It will be obvious that the operation of this arrangement is as above described with reference to the other forms of valve.

In the form shown in Fig. 4, the counter-balance lever 70 bearing on the valve spindle 71, carries a vessel 72 full of liquid and provided with a tap 73 which can be adjusted to allow the liquid to run out at the desired rate, thus decreasing the load on the valve automatically and allowing the tun to empty at any desired rate.

In the form shown in Fig. 5 an automatically adjustable counter-balance weight is shown said weight being actuated by clockwork and being adapted to change its position on the counter-balance lever either at a fixed rate or intermittently for the purposes hereinafter described. As here shown the counter-balance weight is in the form of a casing 27 carrying a winding drum 28 and clockwork train, 29, 30, 31, a fly governor 32 being provided. The counter-balance lever 33 of the pressure regulating valve passes through said casing and is notched or racked on its under side as shown, a pinion 34 driven by the clockwork train within the casing 27 being adapted to gear with same. Guide rollers 35, 36 serve to guide the casing along the lever 33 the latter roller being carried on a pivoted arm 37 adapted to be swung up out of the way by a hand lever 38 mounted outside the casing, when it is desired to introduce or withdraw the lever 33 from said casing.

With the above described arrangement, when the clockwork is set in motion the casing 27 is moved along the counter-balance lever 33 toward the pivot point of same at a speed determined by the nature of the clockwork, thus gradually decreasing the load upon the pressure valve, the portion of the stem 39 of which is shown. When the sparging operation is completed, if the clockwork be set in motion, the mash tun can be gradually emptied, the clockwork being arranged so as to decrease the load on the valve at such a rate as to allow the tun to empty with the least possible suction on the false bottom within the tun. When the clockwork is not in motion the arrangement of course acts as an ordinary counter-balance weight. It will be obvious that any suitable arrangement of clockwork may be employed for this purpose. In another form of the invention, the pressure of the wort within the tun, itself automatically causes the necessary movement of the counter-balance weight and thus itself regulates the opening of the pressure valve. For this purpose the clockwork arrangement shown in Fig. 5 is provided with a pendulum 40 having an adjustable pin 41 which is adapted to make contact with the fly 32 in order to stop the clockwork when the lever 33 is in the horizontal position, but which, when the said lever 33 falls below the horizontal owing to decrease of the pressure of the wort on the valve releases the fly and allows the clockwork to operate causing the weight or casing 27 to move toward the pivot point of the lever 33 and thus decrease the load upon the valve. When the load has been sufficiently decreased the lever 33 owing to the pressure of the wort on the valve rises to its horizontal position again and the pendulum 40 swinging forward stops the clockwork. The clockwork device shown in Fig. 5 is provided with stopping means, which may be actuated by hand or automatically when the casing 27 reaches the end of its travel on the lever 33. Such means consist of a lever 42 pivoted to the casing at 43 and having at its lower end a bent lever 44 adapted when the upper end of the lever is moved contra clockwise to come in contact with the fly 32 to stop same. For securing the desired movement of the lever 42 by hand, a thumb piece 45 is pivoted to the outside of the casing 27 said thumb piece having an inclined projection 46 adapted when depressed to ride over a pin 47 attached to the lever 42 and projecting through the casing, thus moving the lever in a contra-clockwise direction. The pin 47 is retained in a notch 48 in the thumb piece until the latter is lifted again. To obtain an automatic movement of the lever 42 when the casing 27 is at the end of its travel on the lever 33, said lever 42 is provided with a pin 49, projecting through the casing 27 as shown, said pin being adapted to make contact with a stop 50 on the lever 33. When said pin 49 meets the stop 50 the lever 42 is moved in a contra-clockwise direction, causing the pin 44 to meet the fly 32 thus stopping the clockwork. Obviously many forms of stop device, automatic or otherwise may be devised for this purpose. Also means other than a pendulum may be employed for starting and stopping the clockwork.

In the form shown in Fig. 6, the counter-balance lever 80, bearing on the valve spindle 81 carries a vessel 82 filled with liquid and having an outlet pipe 83 at the bottom thereof. A pendulum 84 pivoted at 85 to the vessel 82 has a washer 86 of rubber or other material adapted to close the outlet 83 when the lever 80 is in the horizontal position as shown. It will be obvious that when the lever 80 falls below the horizontal the pendulum 84 will swing and open the outlet 83 allowing liquid to run out until the weight is sufficiently decreased to enable the lever 80 to regain the horizontal. The action of this apparatus is similar to that described with reference to Fig. 5.

What I claim is:—

1. In combination, a mash tun, a perforated false bottom in same, an outlet for the wort and an adjustable pressure valve controlling said outlet.

2. In combination, a mash tun, a perforated false bottom in same, an outlet for the wort below said false bottom, and an adjustable pressure valve controlling said outlet.

3. In combination, a mash tun, a perforated false bottom in same, an outlet for the wort below said false bottom, a valve controlling said outlet having a spindle, a counter-balance lever bearing on said spindle and a weight on the counter-balance lever adapted to change its position thereon automatically.

4. In combination, a mash tun, a perforated false bottom in same, an outlet for the wort below said false bottom, a valve controlling said outlet having a spindle, a counter-balance lever bearing on said spindle and a weight on the counter-balance lever adapted to change its position automatically thereon when the counter-balance lever is out of the horizontal.

5. In combination, a mash tun, a perforated false bottom in same, an outlet for the wort below said false bottom, a valve controlling said outlet having a spindle, a counter-balance lever bearing on said spindle and a casing containing a clockwork train movably mounted on said lever.

6. In combination, a mash tun, a perforated false bottom in same, an outlet for the wort below said false bottom, a valve controlling said outlet having a spindle, a counter-balance lever bearing on said spindle, notches on the underside of said lever, a casing movably mounted on said lever, a clockwork train in said casing, gearing with the notches on the lever, and suitable actuating means for the clockwork train.

7. In combination, a mash tun, a perforated false bottom in same, an outlet for the wort below said false bottom, a valve controlling said outlet having a spindle, a counter-balance lever bearing on said spindle, notches on said lever, a casing movably mounted on said lever, a clockwork train in said casing gearing with the notches on the lever, spring actuating means for the clockwork train, and a pendulum for stopping the clockwork when the counter-balance lever is horizontal.

In witness whereof I have hereunto set my hand in the presence of two subscribing witnesses.

STANTON WILDING COLE.

Witnesses:
ARTHUR MILES,
FRANCIS NORRIS WARDL.

Copies of this patent may be obtained for five cents each, by addressing the "Commissioner of Patents, Washington, D. C."